US006938467B2

(12) United States Patent
Tsujita

(10) Patent No.: US 6,938,467 B2
(45) Date of Patent: Sep. 6, 2005

(54) TRANSMITTER OF TIRE CONDITION MONITORING APPARATUS

(75) Inventor: Yasuhisa Tsujita, Ogaki (JP)

(73) Assignee: Pacific Industrial Co., Ltd. (JP)

( * ) Notice: Subject to any disclaimer, the term of this patent is extended or adjusted under 35 U.S.C. 154(b) by 19 days.

(21) Appl. No.: 10/163,052

(22) Filed: Jun. 4, 2002

(65) Prior Publication Data

US 2003/0115945 A1 Jun. 26, 2003

(30) Foreign Application Priority Data

Dec. 21, 2001 (JP) ....................................... 2001-390435

(51) Int. Cl.[7] ............................................... G01M 17/02

(52) U.S. Cl. ........................ 73/146; 73/146.3; 73/146.5

(58) Field of Search ................................ 73/146–146.8; 340/442–449

(56) References Cited

U.S. PATENT DOCUMENTS 5,109,213 A * 4/1992 Williams .................... 340/447
5,539,674 A * 7/1996 Barbier et al. .............. 702/138
5,612,671 A * 3/1997 Mendez et al. ............. 340/447
5,825,286 A 10/1998 Coulthard ................... 340/447
6,002,327 A * 12/1999 Boesch et al. .............. 340/442
6,112,585 A * 9/2000 Schrottle et al. .............. 73/146
6,118,369 A * 9/2000 Boesch ....................... 340/443
6,218,936 B1 * 4/2001 Imao .......................... 340/447
6,340,929 B1 * 1/2002 Katou et al. ................ 340/447

* cited by examiner

*Primary Examiner*—William Oen
*Assistant Examiner*—Jermaine Jenkins
(74) *Attorney, Agent, or Firm*—Marsh Fischmann & Breyfogle LLP

(57) ABSTRACT

A transmitter for a tire condition monitoring apparatus, which is powered by a battery. The transmitter includes a sensor for periodically detecting the condition of the tire, a transmission circuit for wirelessly transmitting data representing the detected tire condition, and a controller for controlling the sensor and the transmission circuit. When the detected tire condition is abnormal, the controller shortens the detection interval of the sensor. As a result, the transmitter immediately informs a driver of abnormality in the condition of the tire.

11 Claims, 6 Drawing Sheets

TRANSMITTER OF TIRE CONDITION MONITORING APPARATUS

BACKGROUND OF THE INVENTION

The present invention relates to a transmitter of a wireless tire condition monitoring apparatus that allows a driver in a vehicle passenger compartment to check the conditions such as the air pressure of the tires.

Wireless tire condition monitoring apparatuses have been proposed for allowing a driver in a vehicle passenger compartment to check the conditions of vehicle tires. Such monitoring apparatus includes transmitters and a receiver. Each transmitter is located in one of the tires and the receiver is located in the body frame of the vehicle. Each transmitter detects the conditions of the associated tire, such as the air pressure and the temperature, and wirelessly transmits the detection information. The receiver receives the information from the transmitters via an antenna provided on the receiver. The condition of each tire is then displayed, for example, on the indicator located near the driver's seat.

Since each transmitter is powered by a battery, the transmitter stops operating when the battery runs down. At such a time, each transmitter cannot detect the conditions of the corresponding tire. However, each transmitter is attached to the corresponding wheel and is located in the corresponding tire. To change the battery of a transmitter, the tire must be removed from the wheel. Changing the battery of a transmitter is therefore burdensome. Further, the transmitters are constructed with a high accuracy to be durable against the harsh condition in the tire. Therefore, opening the casing of a transmitter for changing the battery can make the transmitter less reliable. Accordingly, changing the battery is not practical.

The capacity of the battery may be increased to permit the transmitter to function for a long period without changing the battery. This, however, increases the size and the weight of the battery thus altering the balance of the corresponding tire. Therefore, the capacity of the battery cannot be increased beyond a certain limit.

Accordingly, some prior art apparatuses use transmitters that only periodically detect the tire conditions and transmit data that represents the tire condition. This minimizes the cumulative operating time of the transmitters, which allows batteries having a relatively small capacity to be used for a long period.

To extend the life of the batteries, the detection interval of each transmitter is preferably increased. However, if the detection interval is increased, the transmitter cannot inform abnormal changes in the air pressure in detail in a case when the air pressure rapidly decreases by, for example, damage. On the other hand, if the detection interval of each transmitter is relatively short, the transmitter can inform abnormal changes in the air pressure in detail. However, in this case, the cumulative operating time of the transmitters increases, thus shortening the life of the batteries. It is difficult to solve such conflicting problems.

SUMMARY OF THE INVENTION

Accordingly, it is an objective of the present invention to provide a transmitter for a tire condition monitoring apparatus that informs a driver of abnormal changes in the condition of a tire in detail and conserves battery strength.

To achieve the above objective, the present invention provides a transmitter for a monitoring apparatus that monitors the condition of a vehicle tire. The transmitter is powered by a battery and includes a sensor, a transmission circuit, and a controller. The sensor periodically detects the condition of the tire. The transmission circuit wirelessly transmits data representing the detected condition of the tire. The controller controls the sensor and the transmission circuit and changes a detection interval of the sensor in accordance with the detected tire condition.

The present invention also provides a method for monitoring the condition of a vehicle tire. The method includes the step of detecting the tire condition periodically, and transmitting a radio signal representing the detected tire condition periodically, and changing a detection interval and a transmission interval in accordance with the detected tire condition.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A tire condition monitoring apparatus 1 according to one embodiment of the present invention will now be described with reference to FIGS. 1 to 8.

Figure 1:
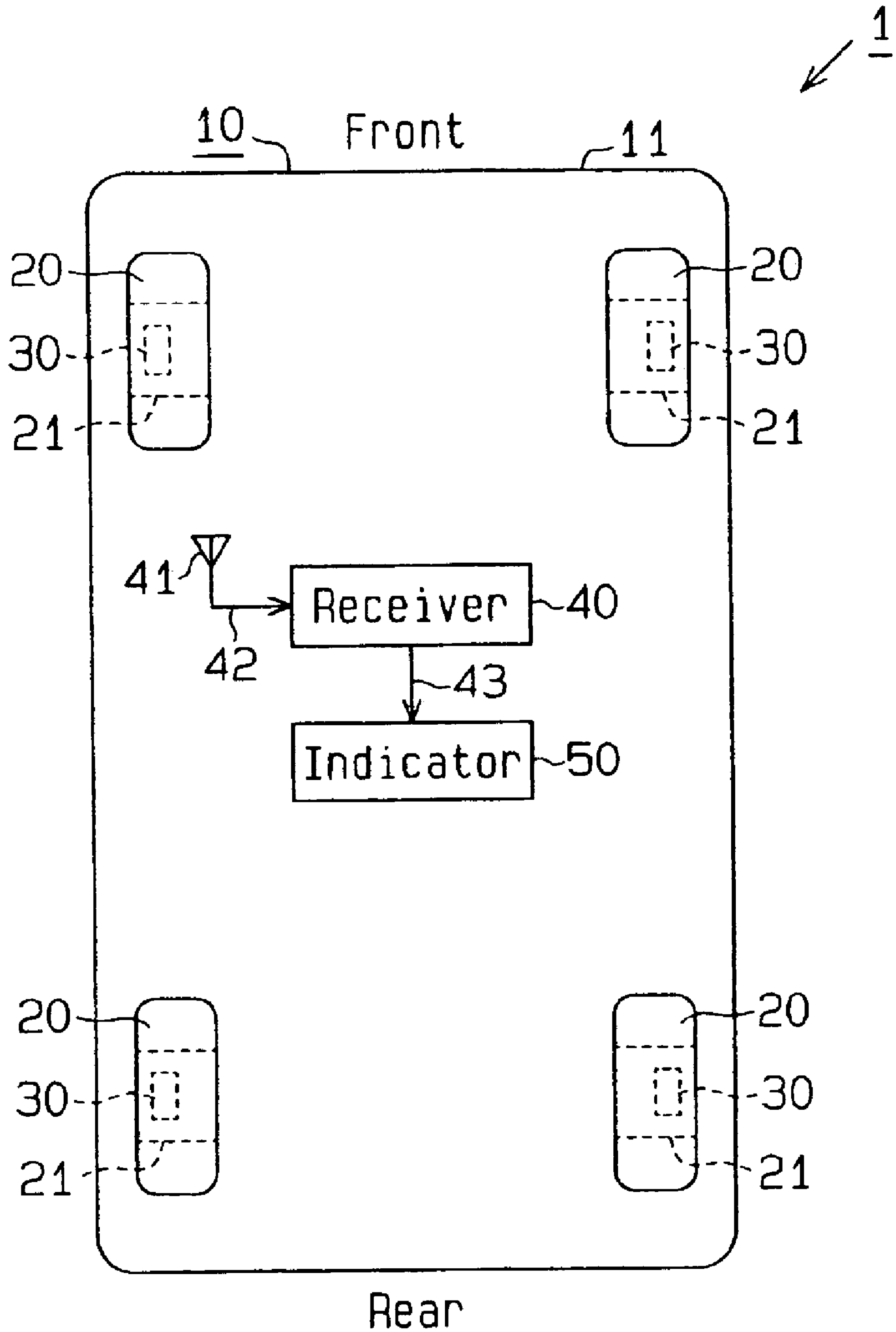
FIG. 1 is a block diagram illustrating a tire condition monitoring apparatus according to a first embodiment of the present invention.

As shown in FIG. 1, the tire condition monitoring apparatus 1 includes four transmitters 30 and a receiver 40. Each of the transmitters 30 is arranged in one of tires 20 of a vehicle 10. The receiver 40 is located in a body frame 11 of the vehicle 10.

Each transmitter 30 is secured to the wheel of the associated tire 20 such that the transmitter 30 is located within the tire 20. Each transmitter 30 detects the condition of the corresponding tire 20, which in this embodiment the condition is the air pressure and the temperature in the tire 20. The transmitter 30 then transmits a radio signal, which includes data representing, in this embodiment, the detected air pressure and the temperature, to the receiver 40.

The receiver 40 is located at a predetermined position in the body frame 11 and is activated by the current supply from a battery (not shown) of the vehicle 10. A reception antenna 41 is connected to the receiver 40 with an antenna cable 42. A coaxial cable, which is not easily affected by noise, is preferably used as the antenna cable 42. The receiver 40 receives data transmitted from the transmitters 30 through the reception antenna 41.

An indicator 50 is arranged in the vehicle compartment such that a driver of the vehicle 10 can see the indicator 50. The indicator 50 is connected to the receiver 40 through an indicator cable 43.

Figure 2:
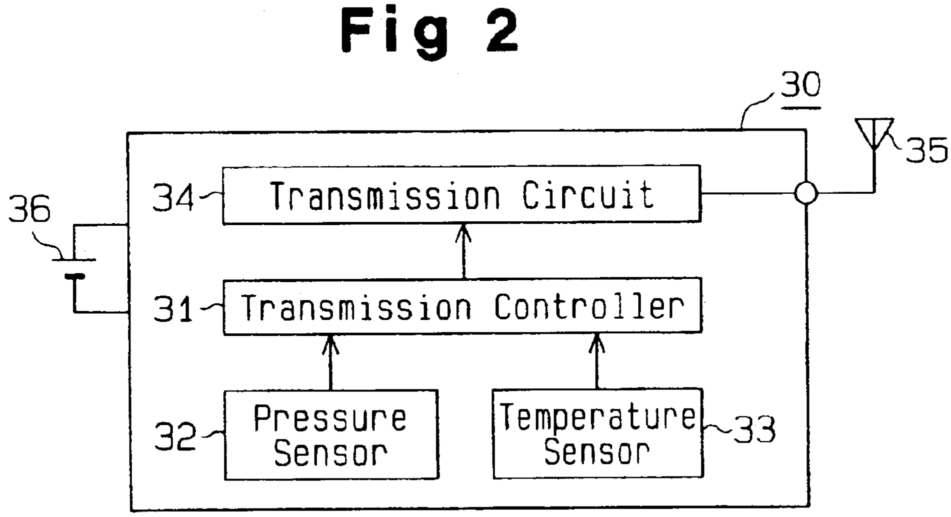
FIG. 2 is a block diagram illustrating the transmitter of the monitoring apparatus shown in FIG. 1.

As shown in FIG. 2, each transmitter 30 includes a transmission controller 31, which is, for example, a microcomputer. The transmission controller 31 includes a central processing unit (CPU), a read only memory (ROM), and a random access memory (RAM). A unique ID code is registered as an identification data in an internal memory of each transmission controller 31 such as the ROM. Each ID code is used to distinguish the associated transmitter 30 from the other three transmitters 30.

Each transmitter 30 also includes a pressure sensor 32, a temperature sensor 33, and a transmission circuit 34. Each pressure sensor 32 detects the internal air pressure of the associated tire 20 and sends the data representing the detected pressure to the corresponding transmission controller 31. The temperature sensor 33 detects the temperature in the associated tire 20 and sends the data representing the temperature to the corresponding transmission controller 31.

The transmission controller 31 then sends the data representing the detected pressure, the detected temperature, and the ID code registered in the internal memory to the corresponding transmission circuit 34. The transmission circuit 34 encodes and modulates the data sent from the transmission controller 31 and then transmits a radio signal representing the data through a transmission antenna 35. Each transmitter 30 has a battery 36 and is activated by the current supply therefrom.

Figure 3:
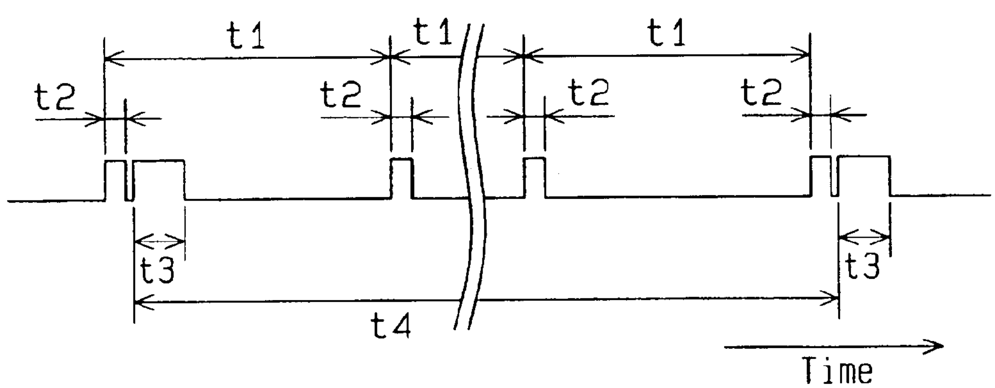
FIG. 3 is a timing chart for describing the operation of the transmitter shown in FIG. 2.

As shown in FIG. 3, the transmission controller 31 commands the pressure sensor 32 and the temperature sensor 33 to take a measurement at every predetermined time interval t1 (fifteen seconds in this embodiment). The time interval t1 will be referred to as a detection interval. A time period t2 shown in FIG. 3 is a period from when the pressure sensor 32 and the temperature sensor 33 start measuring until the resultant data is processed by the transmission controller 31. The time t2 will be referred to as a detection time.

The transmission controller 31 counts the number of times that the pressure sensor 32 and the temperature sensor 33 perform measuring and commands the transmission circuit 34 to transmit signals when the number of detection times reaches a certain number (forty in this embodiment). In this embodiment, the detection interval t1 of the pressure sensor 32 and the temperature sensor 33 is fifteen seconds. Therefore, as shown in FIG. 3, the transmission controller 31 commands the transmission circuit 34 to transmit signals at predetermined time interval t4, which is ten minutes (10 minutes=15 seconds×40) in this embodiment. The time t4 will be referred to as a transmission interval. A time period t3 in FIG. 3 represents a period during which the transmission circuit 34 is performing a transmission. The time t3 will hereafter be referred to as a transmission time. The transmitter 30 is in a sleep state and consumes little battery energy other than during the detection time t2 and the transmission time t3.

The detection interval t1 and the transmission interval t4 are determined considering the capacity of the battery 36, the power consumption of the transmitter 30 and the operating times t2, t3 of the transmitter 30. It has been confirmed that, if the battery 36 has a capacity of 1000 mAh, the detection interval t1 is fifteen seconds, and the transmission interval t4 is ten minutes, the life of the battery 36 is more than ten years.

The transmission controller 31 commands the transmission circuit 34 to perform a transmission at every transmission interval t4. The transmission controller 31 determines whether a predetermined condition is satisfied based on the pressure data from the pressure sensor 32 and temperature data from the temperature sensor 33. If the predetermined condition is satisfied, the transmission controller 31 commands the pressure sensor 32 and the temperature sensor 33 to take a measurement in addition to the periodical measurement at every detection interval t1. The measurement condition is satisfied, for example, when the pressure of the tire 20 abruptly changes or when the internal temperature of the tire 20 is abnormally increased.

Figure 4:
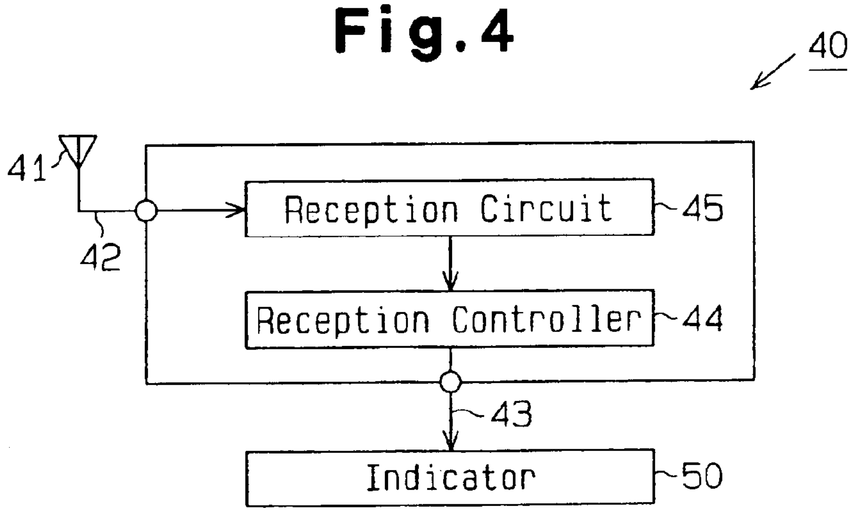
FIG. 4 is a block diagram illustrating the receiver of the monitoring apparatus shown in FIG. 1.

As shown in FIG. 4, the receiver 40 includes a reception controller 44 and a reception circuit 45 for processing data received through the reception antenna 41. The reception controller 44, which is, for example, a microcomputer, includes a central processing unit (CPU), a random access memory (RAM) and a read only memory (ROM) The reception circuit 45 receives data transmitted from the transmitters 30 through the reception antenna 41. The reception circuit then demodulates and decrypts the received data and transmits the data to the reception controller 44.

The reception controller 44 obtains the air pressure and the temperature in each tire 20 corresponding to a transmitter 30 based on the received data. The reception controller 44 controls the indicator 50 to display the data representing the air pressure and the data representing the temperature. Particularly, if the air pressure or the temperature of the associated tire 20 is abnormal, the information indicating the abnormality of the air pressure or the temperature is also displayed in the indicator 50. The receiver 40 is activated when a key switch (not shown) of the vehicle 10 is turned on.

Operation of each transmitter 30 when measuring the air pressure Pn in the corresponding tire 20 will now be described with reference of the flowchart of FIGS. 5 and 6. The flowchart shown in FIG. 5 illustrates the normal air pressure operation mode performed at every detection interval t1, which is fifteen seconds.

Figure 5:
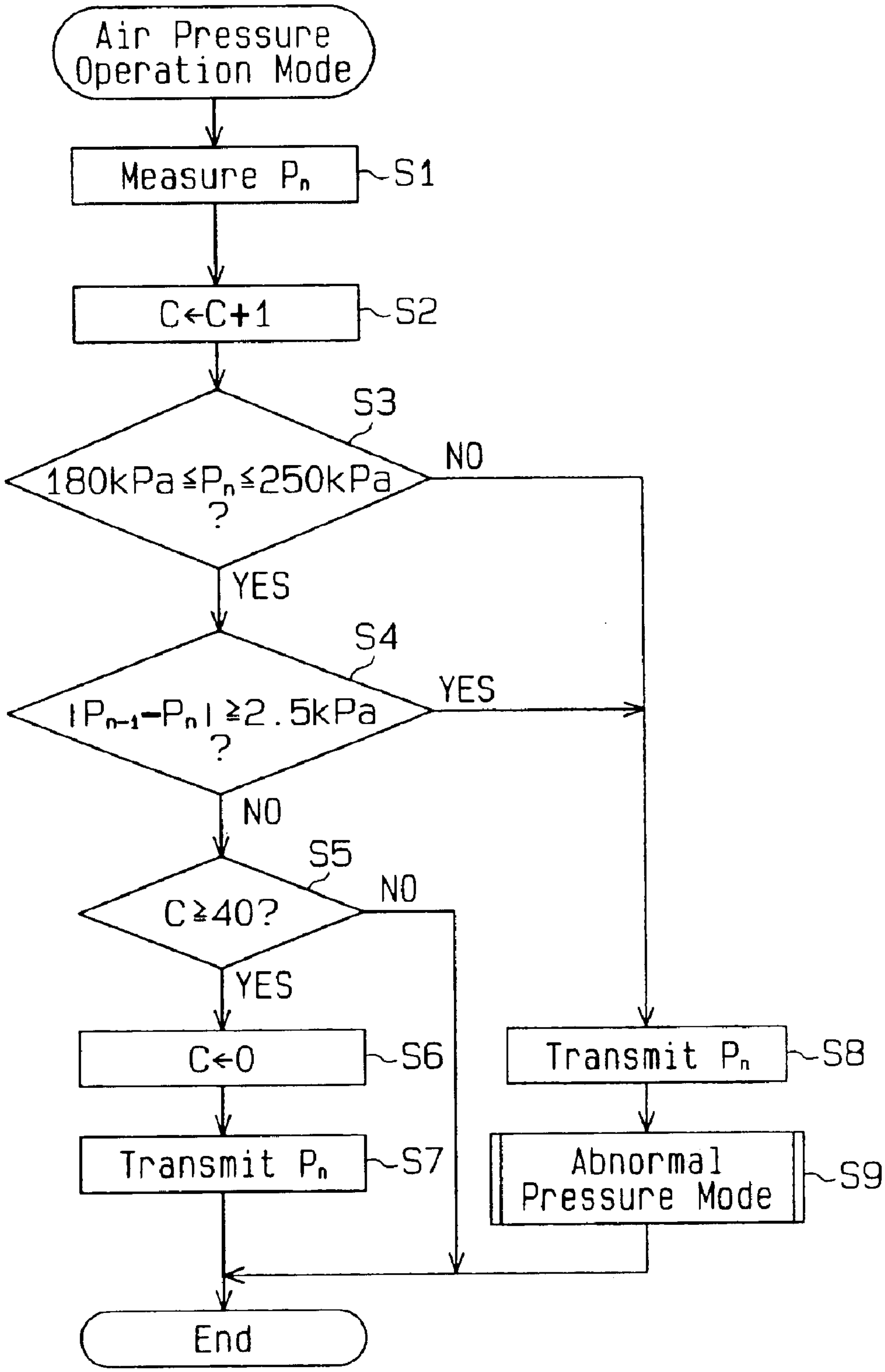
FIG. 5 is a flow chart illustrating the air pressure monitoring operation of the transmitter shown in FIG. 2.

As shown in FIG. 5, in step S1, the transmission controller 31 commands the pressure sensor 32 to detect the air pressure P in the tire 20.

In step S2, the transmission controller 31 increments a count value C by one. The count value C indicates the number of times that the pressure sensor 32 performs measuring at fifteen seconds intervals.

At step S3, the transmission controller 31 judges whether the air pressure Pn in the tire 20 is within the acceptable range (180 kPa to 250 kPa in this embodiment). If it is determined that the air pressure Pn in the tire 20 is within the acceptable range, the transmission controller 31 proceeds to step S4. If it is determined that the air pressure Pn in the tire 20 is not within the acceptable range, the transmission controller 31 proceeds to step S8.

At step S4, the transmission controller 31 judges whether the absolute value of the difference between the pressure Pn−1 of the previous measurement and the pressure Pn of the current measurement is greater than or equal to a predetermined value (2.5 kPa in this embodiment). In other words, the transmission controller 31 determines whether the variation amount of the pressure in the tire 20 has reached a value greater than or equal to 2.5 kPa within fifteen seconds, or between from the previous pressure detection and the current pressure detection. If the determination is positive at step S4, the transmission controller 31 proceeds to step S8. If the determination is negative at step S4, the controller proceeds to step S5.

At step S5, the transmission controller 31 judges whether the count value C has reached forty, or whether the pressure sensor 32 has measured the pressure in the tire 20 forty times. If the count value C has reached forty, the transmission controller 31 moves to step S6. If the count value C has not reached forth, the transmission controller 31 temporarily stops the routine. Then, the transmission controller 31 returns to step S1 and controls the pressure sensor 32 to detect the air pressure Pn in the tire 20 after the detection interval t1 elapses, or after fifteen seconds elapses from the previous detection of the air pressure Pn.

At step S6, the transmission controller 31 judges that the transmission interval t4, which is ten minutes, has elapsed and resets the count value C to zero.

At step S7, the transmission controller 31 transmits the data representing the ID code and the air pressure Pn from the transmission circuit 34 through the transmission antenna 35.

At step S8, the transmission controller 31 judges that the air pressure of the tire 20 is abnormal or the change in the air pressure is abnormal. The transmission controller 31 then transmits the data representing the ID code and the air pressure Pn from the transmission circuit 34 through the transmission antenna 35.

At step S9, the transmission controller 31 starts an abnormal pressure mode.

Figure 6:
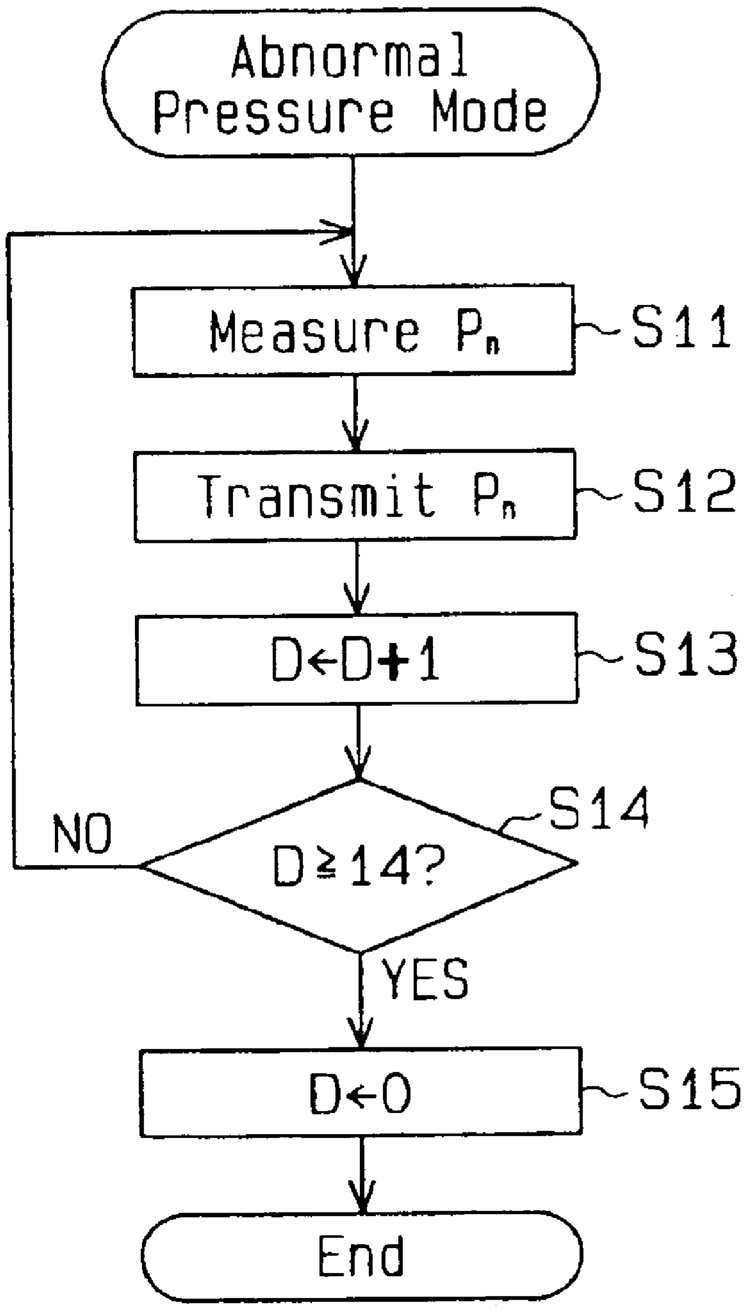
FIG. 6 is a flow chart illustrating the abnormal pressure mode of the transmitter shown in FIG. 2.

In the abnormal pressure mode shown in FIG. 6, the pressure sensor 32 detects the pressure every second instead of detecting at every detection interval t1, which is fifteen seconds. The data representing the ID code and the air pressure Pn is also transmitted every second.

At step S11, the transmission controller 31 controls the pressure sensor 32 to detect the air pressure Pn in the tire 20 every second.

At step S12, the transmission controller 31 controls the transmission circuit 34 to transmit the data representing the ID code and the air pressure Pn through the transmission antenna 35.

At step S13, the transmission controller 31 increments a count value D by one. The count value D indicates the number of times that the pressure sensor 32 detects the pressure every second.

At step S14, the transmission controller 31 judges whether the count value D has reached fourteen, or whether the pressure sensor 32 has measured the pressure Pn in the tire 20 fourteen times. If the count value D has reached fourteen, the transmission controller 31 moves to step S15. If the count value D has not reached fourteen, the transmission controller 31 returns to step S11 and controls the pressure sensor 32 to continue measuring the pressure Pn every second.

At step S15, the transmission controller 31 resets the count value D to zero so that the abnormal air pressure mode is temporarily suspended. Thus, the abnormal air pressure mode lasts only for the period of detection interval t1, which is fifteen seconds.

Operation of each transmitter 30 when measuring the temperature Tn in the corresponding tire 20 will now be described with reference of the flowchart of FIGS. 7 and 8. The operation for measuring the temperature Tn is performed simultaneously with the operation for measuring the air pressure Pn. The flowchart shown in FIG. 7 illustrates the normal temperature operation mode performed at every detection interval t1, which is fifteen seconds.

Figure 7:
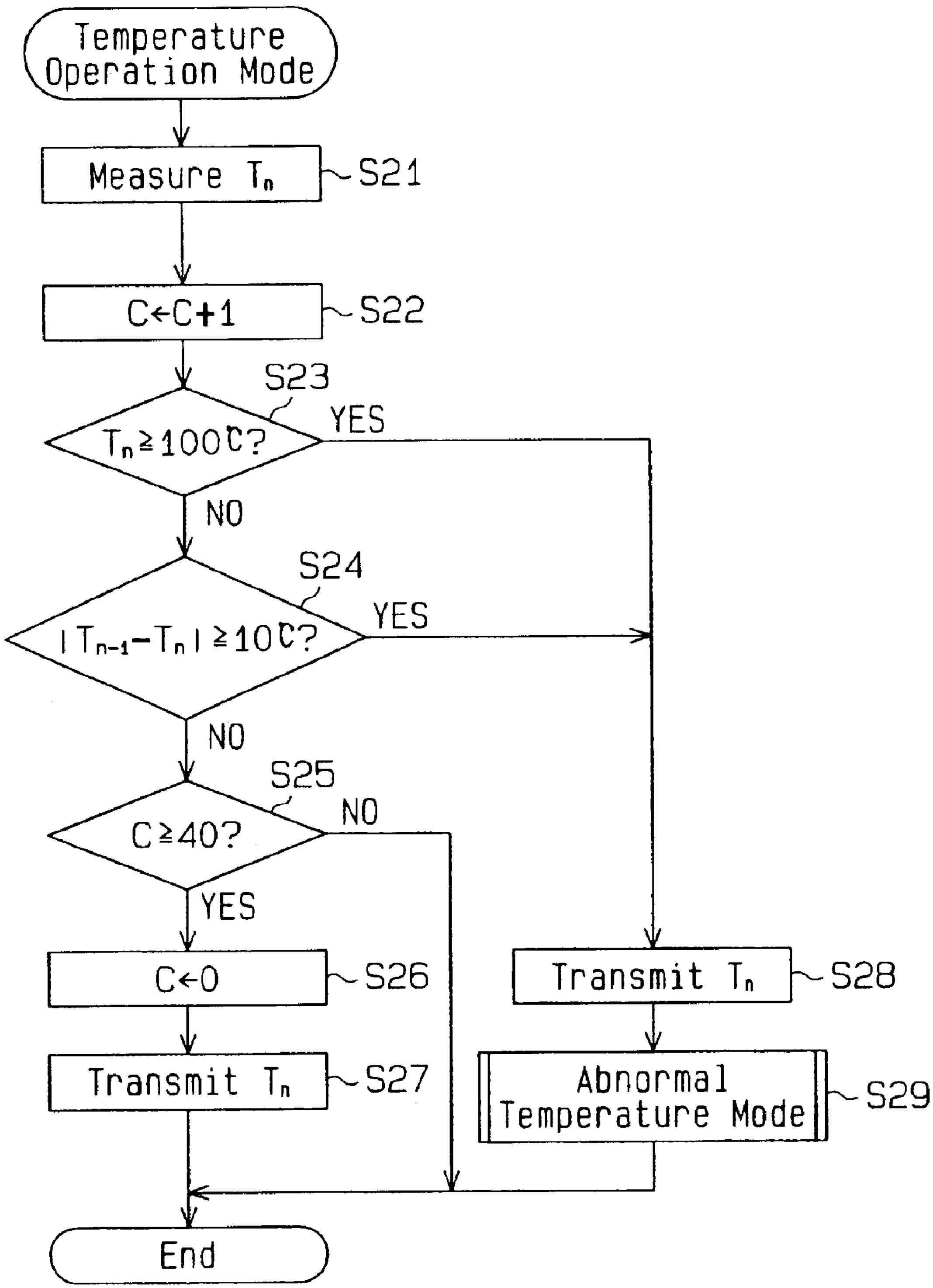
FIG. 7 is a flow chart illustrating the temperature monitoring operation of the transmitter shown in FIG. 2.

As shown in FIG. 7, at step S21, the temperature sensor 33 detects the temperature Tn in the tire 20 every 15 seconds.

At step S22, the transmission controller 31 increments the count value C by one. The count value C indicates the number of times that the temperature sensor 33 takes a measurement at fifteen seconds intervals.

At step S23, the transmission controller 31 judges whether the temperature Tn in the tire 20 is greater than or equal to a predetermined acceptable temperature, which is equal to 100 degrees Celsius in this embodiment. If it is determined that the temperature Tn in the tire 20 is greater than or equal to the acceptable temperature, the transmission controller 31 proceeds to step S28. If it is determined that the temperature Tn in the tire 20 is less than the acceptable temperature, the transmission controller 31 proceeds to step S24.

At step S24, the transmission controller 31 judges whether the absolute value of the difference between the pressure Tn−1 of the previous measurement and the pressure Tn of the current measurement is greater than or equal to a predetermined value (10 degrees Celsius in this embodiment). In other words, the transmission controller 31 judges whether the pressure in the tire 20 has changed by an amount greater than or equal to 10 degrees Celsius within fifteen seconds, or between from the previous temperature detection and the current temperature detection. If the determination is positive at step S24, the transmission controller 31 proceeds to step S28. If the determination is negative at step S24, the controller proceeds to step S25.

At step S25, the transmission controller 31 judges whether the count value C has reached forty, or whether the temperature sensor 33 has measured the temperature in the tire 20 forty times. If the count value C has reached forty, the transmission controller 31 moves to step S26. If the count value C has not reached forth, the transmission controller 31 temporarily stops the routine. Then, the transmission controller 31 return to the step S21 and controls the temperature sensor 33 to detect the temperature Tn in the tire 20 after the detection interval t1 elapses, or after fifteen seconds elapses from the previous detection of the temperature Tn.

At step S26, the transmission controller 31 judges that the transmission interval t4, which is ten minutes, has elapsed and resets the count value C to zero.

At step S27, the transmission controller 31 transmits the data representing the ID code and the temperature Tn from the transmission circuit 34 through the transmission antenna 35.

At step S28, the transmission controller 31 judges that the temperature in the tire 20 is abnormal or the change in the temperature is abnormal. The transmission controller 31 then transmits the data representing the ID code and the temperature Tn from the transmission circuit 34 through the transmission antenna 35.

At step S29, the transmission controller 31 is turned into an abnormal temperature mode.

Figure 8:
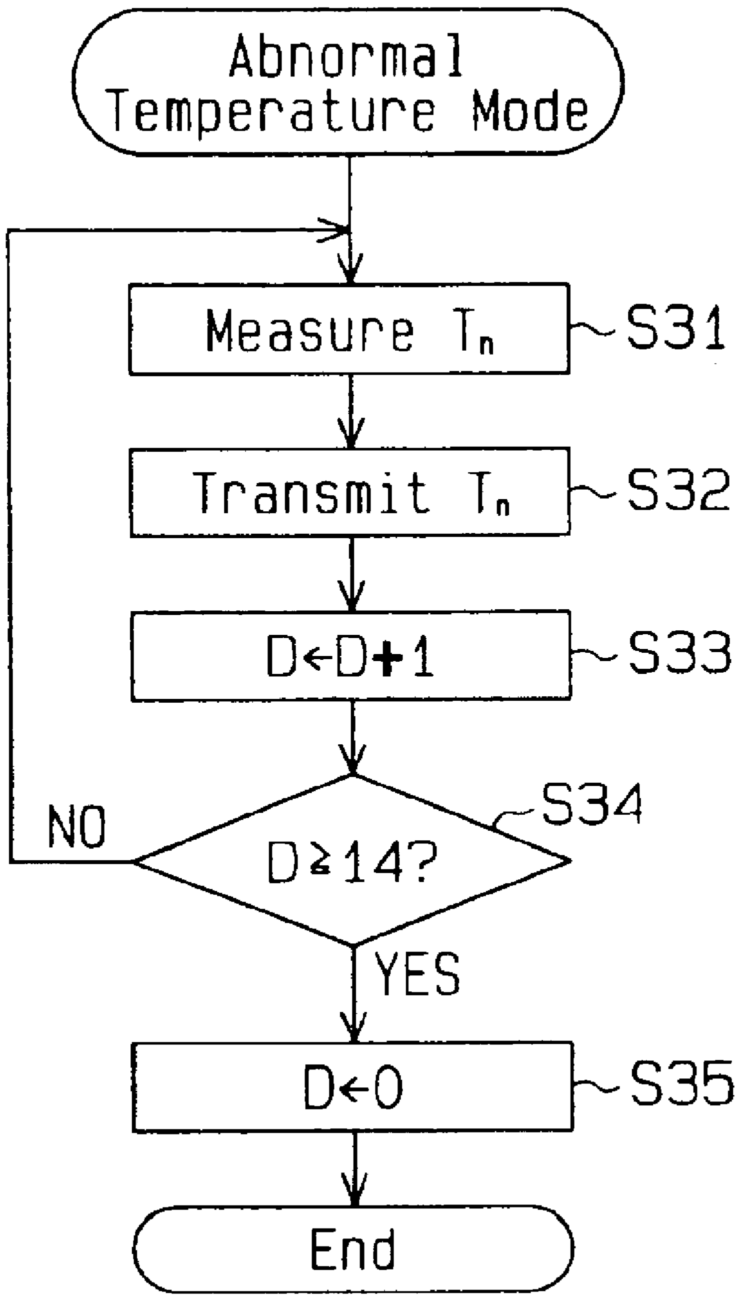
FIG. 8 is a flow chart illustrating the abnormal temperature mode of the transmitter shown in FIG. 2.

In the abnormal temperature mode shown in FIG. 8, the temperature sensor 33 detects the temperature every second instead of detecting at every detection interval t1, which is fifteen seconds. The data representing the ID code and the temperature Tn is also transmitted every second.

At step S31, the transmission controller 31 controls the temperature sensor 33 to detect the temperature Tn in the tire 20 every second.

At step S32, the transmission controller 31 controls the transmission circuit 34 to transmit the data representing the ID code and the temperature Tn through the transmission antenna 35.

At step S33, the transmission controller 31 increments the count value D by one. The count value D indicates the number of times that the temperature sensor 33 detects the temperature Tn every second.

At step S34, the transmission controller 31 judges whether the count value D has reached fourteen, or whether the temperature sensor 33 has measured the temperature Tn in the tire 20 fourteen times. If the count value D has reached fourteen, the transmission controller 31 moves to step S35. If the count value D has not reached fourteen, the transmission controller 31 returns to step S31 and controls the temperature sensor 33 to continue to take a measurement every second.

At step S35, the transmission controller 31 resets the count value D to zero so that the abnormal temperature mode is temporarily terminated. Thus, the abnormal temperature mode lasts only for the period of detection interval t1, which is fifteen seconds.

The above illustrated embodiment has the following advantages.

(1) The detection interval t1 of the air pressure Pn and the temperature Tn in the tire 20 is normally set to fifteen seconds. As a result, when the condition of the tire 20 is normal, the condition of the tire 20 is detected at fifteen seconds intervals, which is relatively a long detection interval t1 (first time interval). However, when the condition of the tire 20 is abnormal, the condition of the tire 20 is measured and transmitted every second, which is relatively a short detection interval t1 (second time interval). Thus, the transmitter immediately informs a driver of abnormality in the condition of the tire 20 and conserves battery strength.

(2) If the condition of the tire 20 is abnormal, the transmitter 30 transmits data every second. This increases the possibility that the receiver 40 receives the data even when the receiver 40 is under an environment where the radio wave from the transmitters 30 cannot be received reliably while the condition of the tire 20 is abnormal. The increase in the possibility of receiving data improves the reliability in the communication between the transmitters 30 and the receiver 40 while the condition of the tire 20 is abnormal and thus the driver is reliably informed of the abnormality in the tire 20.

(3) While the normal air pressure operation mode shown in FIG. 5 is performed, the tire 20 might run over a curve stone and the air pressure of the tire 20 might vary temporarily. In this case, the abnormal air pressure mode shown in FIG. 6 is performed. However, the abnormal air pressure mode is only performed during the detection interval t1, which is fifteen seconds. Thus, if the variation in the air pressure is stabilized after fifteen seconds, the abnormal air pressure mode is not continued any further. As a result, measurement and transmission at a relatively short time interval, such as one second, is not performed unnecessarily. Thus, there is no factor that prevents the life of the battery 36 from being extended. Therefore, the life of the battery 36 is extended even when the measurement and the transmission are performed every second in the abnormal air pressure mode. Same advantages are also provided in the abnormal temperature mode.

It should be apparent to those skilled in the art that the present invention may be embodied in many other specific forms without departing from the spirit or scope of the invention. Particularly, it should be understood that the invention may be embodied in the following forms.

The abnormal air pressure mode shown in FIG. 6 may be discontinued if the air pressure Pn in the tire 20 is restored to be within the acceptable range (180 kPa to 250 kPa) while the abnormal air pressure mode is performed. With such structure, the abnormal air pressure mode is not continued unnecessarily, thus suppressing the consumption of the power of the battery 36. Therefore, the life of the battery 36 is more reliably extended.

The abnormal temperature mode shown in FIG. 8 may be discontinued if the temperature Tn in the tire 20 is restored to be within the acceptable temperature (100 degrees Celsius) while the abnormal temperature mode is performed. With this structure, the abnormal air pressure mode is not continued unnecessarily, thus suppressing the consumption of the power of the battery 36. Therefore, the life of the battery 36 more reliably extended.

The detection interval t1 is not limited to fifteen seconds but may be altered according to the type of the tires 20 in which the transmitters 30 are located.

The transmission interval t4 may be altered by changing the number of measurements (forty in the illustrated embodiment) by the pressure sensor 32 and the temperature sensor 33, which determines whether the transmission interval t4 has elapsed.

The acceptable range of the air pressure Pn is not limited to 180 kPa to 250 kPa but may be altered according to the type of the tires 20. That is, for example, when the standard air pressure is 230 kPa, the maximum pressure may be set to plus 20 kPa and the minimum pressure may be set to minus 20 kPa.

The acceptable temperature is not limited to 100 degrees Celsius but may be changed according to the type of the tires 20. That is, the acceptable temperature may be set to 80 or 120 degrees Celsius depending on the environment of the vehicle 10.

The reception antenna 41 may be provided corresponding to each tire 20.

An alarm may be located to notify that the air pressure of the associated tire 20 is abnormal. In this case, a loudspeaker, which is preinstalled in the vehicle 10, may be used as an alarm.

The air pressure data transmitted from the transmitter 30 may include specific value of the air pressure or may simply indicate whether the air pressure is within the acceptable range.

The transmitter and the tire condition monitoring apparatus of the present invention is not limited to a four-wheeled vehicle, but may also be applied to two-wheeled vehicles such as bicycles and bikes, multi-wheeled vehicles such as buses and trucks, or industrial vehicles such as forklifts.

The temperature sensor 33 may be omitted, which allows the transmitter 30 having minimal functions to be manufactured at minimal cost.

Therefore, the present examples and embodiments are to be considered as illustrative and not restrictive and the invention is not to be limited to the details given herein, but may be modified within the scope and equivalence of the appended claims.

What is claimed is:

1. A transmitter for a monitoring apparatus that monitors the condition of a vehicle tire, wherein the transmitter is powered by a battery, the transmitter comprising:

a sensor for periodically detecting the condition of the tire;

a transmission circuit for wirelessly transmitting data representing the detected condition of the tire; and a controller for controlling the sensor and the transmission circuit, wherein the controller changes a detection interval of the sensor in accordance with the detected tire condition wherein, when a variation amount of the detected tire condition is greater than or equal to a predetermined value, the controller controls the detection interval of the sensor to be shorter than that when the variation amount is less than the predetermined value.

2. The transmitter according to claim 1, wherein the variation amount of the detected tire condition is the absolute value of the difference between the detected tire condition of the previous measurement and the detected tire condition of the current measurement.

3. A transmitter for a monitoring apparatus that monitors the condition of a vehicle tire, wherein the transmitter is powered by a battery, the transmitter comprising:

a sensor for periodically detecting the condition of the tire;

a transmission circuit for wirelessly transmitting data representing the detected condition of the tire; and a controller for controlling the sensor and the transmission circuit, wherein the controller changes a detection interval of the sensor in accordance with the detected tire condition wherein the controller determines whether the tire condition is normal based on the detected tire condition, wherein, when determining that the tire condition is normal, the controller controls the sensor to measure the tire condition at a predetermined first time interval, and wherein, when determining that the tire condition is abnormal, the controller controls the sensor to measure the tire condition at a second time interval, which is shorter than the first time interval.

4. The transmitter according to claim 3, wherein the transmission circuit periodically transmits data representing the tire condition, and wherein, when determining that the tire condition is abnormal, the controller controls the transmission interval of the transmission circuit to be shorter than that when it is determined that the tire condition is normal.

5. The transmitter according to claim 3, wherein, when determining that the tire condition is normal, the controller controls the transmission circuit to transmit data every time the tire condition is measured predetermined number of times at the first time interval, and wherein, when determining that the tire condition is abnormal, the controller controls the transmission circuit to transmit data every time the tire condition is measured at the second time interval.

6. A transmitter for a monitoring apparatus that monitors the condition of a vehicle tire, wherein the transmitter is powered by a battery, the transmitter comprising:

a sensor for periodically detecting the condition of the tire;

a transmission circuit for wirelessly transmitting data representing the detected condition of the tire; and a controller for controlling the sensor and the transmission circuit, wherein the controller changes a detection interval of the sensor in accordance with the detected tire condition wherein the controller controls the sensor to measure the tire condition at a predetermined first time interval, and wherein, when determining that the tire condition is abnormal based on the measurement result obtained from the measurement performed at the first time interval, the controller controls the sensor to measure the tire condition at a second time interval, which is shorter than the first time interval, at least during the period of the first time interval.

7. A transmitter for a monitoring apparatus that monitors the air pressure of a vehicle tire, wherein the transmitter is powered by a battery, the transmitter comprising:

a sensor for periodically detecting the air pressure of the tire;

a transmission circuit for periodically transmitting data representing the detected air pressure of the tire; and a controller for controlling the sensor and the transmission circuit, wherein the controller judges whether the air pressure of the tire is normal based on the detected air pressure of the tire, wherein, when determining that the air pressure of the tire is normal, the controller controls the sensor to measure the air pressure of the tire at a predetermined first time interval, and wherein, when determining that the air pressure of the tire is abnormal, the controller controls the sensor to measure the air pressure of the tire at a second time interval, which is shorter than the first time interval, and the controller controls a transmission interval of the transmission circuit to be shorter than that when it is determined that the air pressure of the tire is normal.

8. The transmitter according to claim 7, wherein, when determining that the air pressure of the tire is normal, the controller controls the transmission circuit to transmit data every time the air pressure of the tire is measured predetermined number of times at the first time interval, and wherein, when determining that the tire condition is abnormal, the controller controls the transmission circuit to transmit data every time the air pressure of the tire is measured at the second time interval.

9. The transmitter according to claim 7, wherein, when a variation amount of the detected air pressure of the tire is greater than or equal to a predetermined value, the controller determines that the air pressure of the tire is abnormal.

10. The transmitter according to claim 9, wherein the variation amount of the detected air pressure of the tire is the absolute value of the difference between the detected tire pressure of the previous measurement and the detected tire pressure of the current measurement.

11. A method for monitoring the condition of a vehicle tire, comprising:

detecting the tire condition periodically;

transmitting a radio signal representing the detected tire condition periodically;

determining whether the detected tire condition is normal; and changing a detection interval and a transmission interval in accordance with the detected tire condition, wherein the detection interval and the transmission interval when it is determined that the tire condition is abnormal is shortened from the detection interval and the transmission interval when it is determined that the tire condition is normal.

* * * * *